(12) United States Patent
Bohanek et al.

(10) Patent No.: US 9,053,469 B1
(45) Date of Patent: Jun. 9, 2015

(54) SYSTEM AND METHOD FOR PROVIDING USAGE BASED VEHICLE INSURANCE

(75) Inventors: Robert Michael Bohanek, San Antonio, TX (US); Charles Lee Oakes, III, bOEME, TX (US); Bharat Prasad, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 700 days.

(21) Appl. No.: 12/500,742

(22) Filed: Jul. 10, 2009

(51) Int. Cl.
*G06Q 20/08* (2012.01)

(52) U.S. Cl.
CPC ..................................... *G06Q 20/08* (2013.01)

(58) Field of Classification Search
USPC ....................................................... 705/4, 14
See application file for complete search history.

(56) References Cited

U.S. PATENT DOCUMENTS

| | | | | |
|---|---|---|---|---|
| 5,668,310 | A * | 9/1997 | Parkman et al. | 73/114.52 |
| 6,064,970 | A * | 5/2000 | McMillan et al. | 705/4 |
| 6,092,629 | A | 7/2000 | Bohnert et al. | |
| 6,233,563 | B1 | 5/2001 | Jefferson et al. | |
| 7,343,306 | B1 * | 3/2008 | Bates et al. | 705/4 |
| 7,937,278 | B1 * | 5/2011 | Cripe et al. | 705/4 |
| 2004/0064337 | A1 * | 4/2004 | Nakahara et al. | 705/1 |
| 2005/0139649 | A1 | 6/2005 | Metcalf et al. | |
| 2005/0234773 | A1 * | 10/2005 | Hirst et al. | 705/14 |
| 2006/0226224 | A1 | 10/2006 | Henry | |
| 2008/0021800 | A1 | 1/2008 | Wilmes et al. | |
| 2008/0162193 | A1 * | 7/2008 | Voggenauer | 705/4 |

OTHER PUBLICATIONS

"Automobile Insurance: Pay-at-the-Pump", Senate Committee on Insurance, Claims, and Corporations Art Torres, Chairman, Date of Hearing: Apr. 21, 1993, 6 pages.
"Changing Insurance, One Mile", Contingencies, Nov./Dec. 2003, pp. 34-38.
Mills, Evan: "The insurance and risk management industries: newplayers in the delivery of energy-efficient and renewable energy products and services", Elsevier, Energy Policy, 31, 2003, pp. 1257-1272.
"Pay per use Insurance with GALILEO", Giroads Club, Intelligent Roads, Issue 2, May 2006, 2 pages.
Litman, Todd: "Pay-As-You-Drive Pricing and Insurance Regulatory Objectives", Journal of Insurance Regulation, 19 pages.
"Pay-As-You-Drive Vehicle Insurance, Converting Vehicle Insurance Premiums Into Use-Based Charges" Online TDM Encyclopedia—PAYD Vehicle Insurance, Nov. 24, 2008, 11 pages.

(Continued)

*Primary Examiner* — John Pauls
(74) *Attorney, Agent, or Firm* — Baker & Hostetler LLP

(57) ABSTRACT

Methods and systems for providing usage based insurance for one or more vehicles for an insured individual or party. In an example, fuel transaction data is received for a party, the fuel transaction data includes a fuel cost; insurance policy data is received for an insurance policy; a premium is determined for the insurance policy using a computing device and the premium is added to the fuel cost. In an example, a geographic location for a vehicle is determined and a premium is determined using at the least the geographic location. In an example, a number of miles driven in a time period is determined and a premium is determined using at the least the number of miles driven. In an example, a premium is determined for an insurance policy using at least a portion of the fuel transaction data. In an example, at least one vehicle related parameter is predicted from the fuel transaction data and a premium is determined using the vehicle related parameter.

24 Claims, 10 Drawing Sheets

(56) References Cited

OTHER PUBLICATIONS

Khazzoom, J. Daniel: "Pay-at-the-Pump (PATP) Auto Insurance: Criticisms and Proposed Modifications", Discussion Paper 99-14-REV, Resources for the Future, Jan. 1999, Revised May 2000, 54 pages.

Sugarman, Stephen D.: "'Pay at the pump' Auto Insurance", The California Vehicle Injury Plan (VIP), Institute of Governmental Studies, University of California, Berkeley, 75 pages.

Friedman, David: "Paying at the Pump", 2002 Analysis of Vehicles and Gasoline Costs, Union of Concerned Scientists, Aug. 2002, 69 pages.

* cited by examiner

SYSTEM AND METHOD FOR PROVIDING USAGE BASED VEHICLE INSURANCE

FIELD

This application relates to methods and systems for providing usage based insurance for one or more vehicles for an insured individual or party, an in a specific example, the insurance can be purchased at a fuel dispensing station at the same time as a fuel purchase.

BACKGROUND

Insurance policy premiums are typically calculated based on the vehicle type, driver history and home address. The premium is typically independent of the number of miles driven by the driver or relies upon the driver estimating how many miles are driven in a year. Insurance policy premiums are also typically paid on the basis of time. For example, an insurance policy can be paid every six months thereby giving the insured party six months of insurance coverage.

Various government authorities are studying the concept of charging drivers usage fees based upon the number of miles driven. The term, "Pay as you Drive", is commonly used to refer to such a payment system. As newer more fuel efficient vehicles, such as hybrid vehicles, use less fuel, it is expected that fuel tax revenue will decline and have to be replaced by another source. Charging drivers by the number of miles driven can be done through various means such as road tolls and parking tolls. Charging drivers usage fees based upon the number of miles driven can be used to control vehicle congestion, vehicle usage and vehicle emissions.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an example, a computerized method, and system for performing the method can include receiving fuel transaction data for a party, the fuel transaction data including a fuel cost, receiving insurance policy data for an insurance policy, determining a premium for the insurance policy using a computing device and adding the premium to the fuel cost. The method can include receiving payment for the fuel cost and the premium. The method can include the fuel transaction data further including at least one fuel dispensing location. The method can include determining the premium at least partially based on a vehicle location. The method can include determining the premium at least partially based on a number of miles driven. The method can include the premium being determined such that the insurance policy is in effect for a time period. The method can include the premium being determined such that the insurance policy is in effect for a number of miles driven.

In an example, a computerized method, and system for performing the method can include receiving fuel transaction data, the fuel transaction data at least including a fuel dispensing location, determining a geographic location for a vehicle, determining a premium for an insurance policy for an insured party using a computing device, the premium being determined using at the least the geographic location and communicating the premium to the insured party. The method can include receiving the premium. The method can include the premium being paid from the fuel dispensing location. The method can include the fuel transaction data including an odometer reading of the vehicle. The method can include the fuel transaction data further including at least one driver identity. The method can include the premium being determined such that the insurance policy is in effect for a time period. The method can include the premium being determined such that the insurance policy is in effect for a number of miles driven.

In an example, a computerized method, and system for performing the method can include receiving fuel transaction data, determining a number of miles driven in a time period at least partially using the fuel transaction data, determining a premium for an insurance policy for an insured party using a computing device, the premium being determined using at the least the number of miles driven and communicating the premium to the insured party. The method can include receiving the premium. The method can include the premium being paid from a fuel dispensing location. The method can include the fuel transaction data further including an odometer reading of the vehicle. The method can include the fuel transaction data further including at least one driver identity. The method can include an average speed of a vehicle being determined. The method can include the average speed being used to determine the premium.

In an example, a computerized method, and system for performing the method can include receiving fuel transaction data, receiving insurance policy data for an insurance policy, determining a premium for the insurance policy for an insured party using a computing device, the premium being determined using at least a portion of the fuel transaction data and communicating the premium to the insured party. The method can include receiving the premium. The method can include the premium being paid from a fuel dispensing location. The method can include determining a geographic location of a vehicle. The method can include determining a driver. The method can include determining an average speed of a vehicle. The method can include adding a fuel cost to the premium.

In an example, a computerized method, and system for performing the method can include receiving fuel transaction data associated with a vehicle, predicting at least one vehicle related parameter from the fuel transaction data, determining a premium for an insurance policy for an insured party using a computing device, the premium being determined using the vehicle related parameter, communicating the premium to the insured party. The method can include receiving the premium. The method can include the premium being paid from a fuel dispensing location. The method can include the vehicle related parameter including a geographic location in which the vehicle is operating. The method can include the vehicle related parameter including an average speed of the vehicle. The method can include the vehicle related parameter including a time of day that the vehicle is operating. The method can include adding a fuel cost to the premium.

In further examples, the above method steps are stored on a machine-readable medium comprising instructions, which when implemented by one or more processors perform the steps. In yet further examples, subsystems or devices can be adapted to perform the recited steps. Other features, examples, and embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for interface presentation are described. In the following description, for purposes of explanation, numerous specific details are set forth in order to provide a thorough understanding of example embodiments. It will be evident, however, to one skilled in the art that the present invention may be practiced without these specific details.

Figure 1:
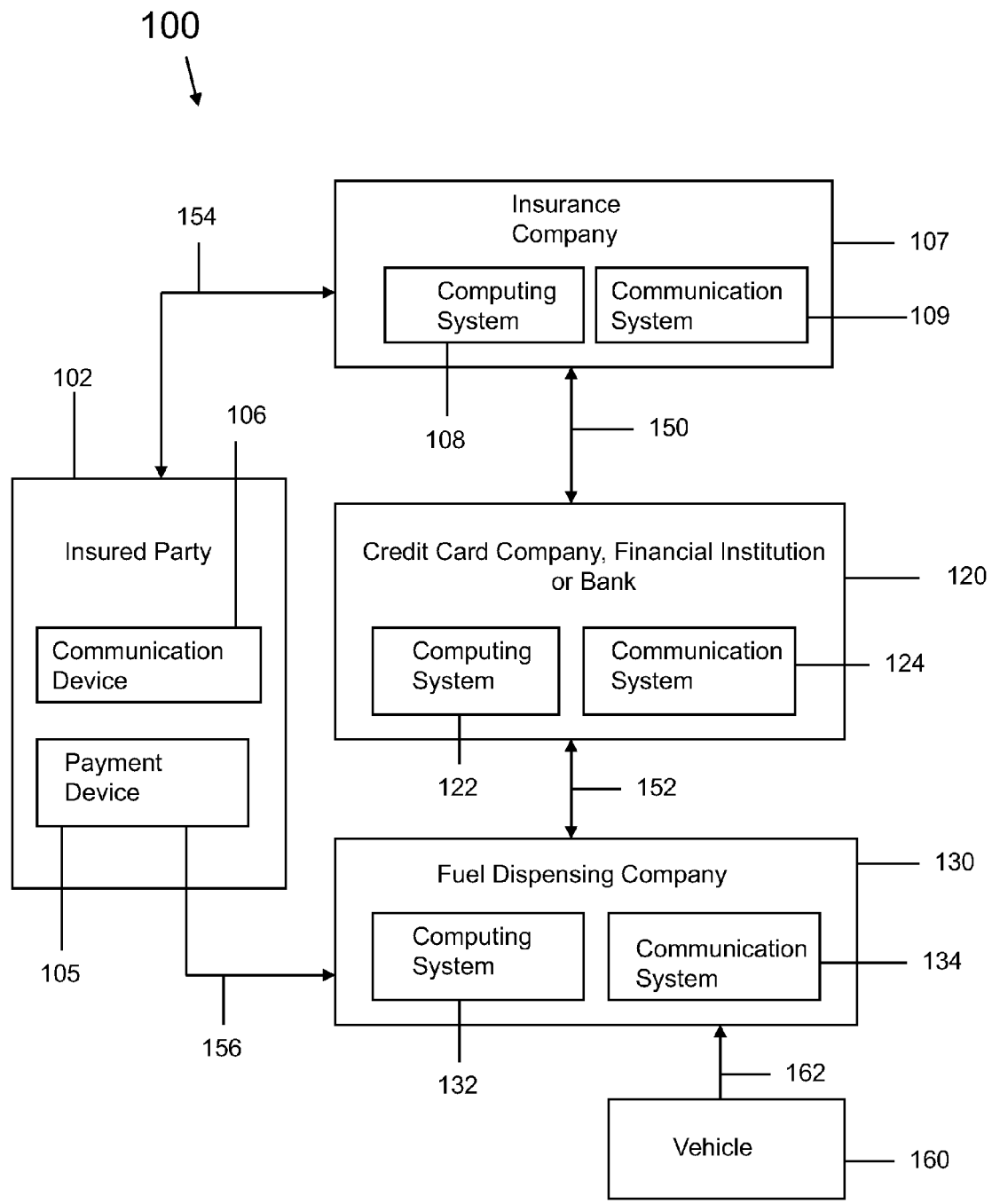
FIG. 1 is a schematic diagram of a system according to an example embodiment.

FIG. 1 illustrates an example computer and communication system 100 which can include an individual, such as an insured individual or insured party 102, who can communicate with an insurance company 107 through a communication network 154. The insurance company 107 can communicate with a credit card company, financial institution or bank 120 through a communication network 150. The credit card company, financial institution or bank 120 can communicate with a fuel dispensing company 130 through a communication network 152.

The insured party 102 in the present description is a person covered under an insurance policy with the insurance company 107. The insured can have multiple properties insured by the company 107. Examples can include personal property, such as personal items, home furnishings, antiques, vehicles, jewelry, motorcycles, boats, airplanes, recreational vehicles, businesses and business equipment etc. and real property, such as primary homes, land, second homes, etc.

An insurance policy is a type of contract between the insurance company and the insured party. In the event of damage or a loss to the insured property, the insurance company is obligated to a claim for the damage or loss. The claim payment may be subject to a deductible. A deductible is a portion of the damage or loss that the insurance company requires the insured party to pay before payments from the insurance company commence.

The insured party 102 can use a wide variety of communication devices 106 to communicate with and provide data to the insurance company 107. Many people today have mobile devices 106 such as personal data assistants, mobile telephones, laptop computers, e-mail devices, netbooks, etc. These devices provide various means of machine-assisted communication and include processing devices and signal transmitter(s) and receiver(s). The insured can also have communication devices 106, such as computers, land based telephones, social networking sites, networked e-mail, pagers, internet, etc. Certain information is associated with the insured that relate the insured with the insurance company. While shown with the insured 102, it will be recognized that this information can be stored at the insurance company as well. It is also recognized that the insurance company may cause statements to be printed and mailed in order to communicate with the insured party. These can be hard copy statements in an example. In an example, the statements are electronic statements that are displayed on electronic devices.

The insured party 102 can also have payment devices 105 such as credit or debit cards that may be used to make purchases such as fuel from a fuel dispensing location or station. The payment devices 105 can be issued by many institutions. In an example, a credit card company, financial institution, bank, fuel dispensing company or insurance company can issue payment devices 105. If the payment device 105 is a credit or debit card, the credit or debit card can be inserted into a fuel or gas pump to purchase fuel and/or insurance.

If the payment device 105 is issued by an insurance company, the payment device 105 can also be configured to serve as proof of insurance for the insured party. In the case of a traffic stop by a police agency, payment device 105 can be presented as proof of insurance.

The payment devices 105 can be an electronic device such as a key tag that identify the purchaser and issue a debit for the purchased amount. If the payment device 105 is an electronic device, the electronic device only needs to be brought within radio frequency range of the gas pump in order to purchase fuel and insurance.

In an example, a single payment device 105 can be issued or tied to one vehicle. In another example, payment devices 105 can be issued to each driver of a one vehicle. In this example, the amount of driving by each driver in a vehicle can be tracked. In an additional example, a single payment device 105 can be issued to each driver and used on multiple vehicles.

Payment devices 105 can transmit or communicate information to the fuel dispensing company commuter system 132 using various communication devices 156 such as magnetic media scanning, radio frequency or optical scanning.

The insurance company 107 is a company that provides risk management that hedges an insured against the risk of a contingent loss. The insurance company will accept the risk of a loss from the insured in exchange for a premium. Generally, insurance can be thought of as a guaranteed small loss, i.e., the premium, to prevent a large, possibly devastating loss. The insurance company 107 includes a computing system 108 and a communication system 109. The computing system includes an insured database, an accounting system, and a business rules system. Each of these systems can further include a storage system, an application system, and a server and can support multiple users at any given time.

Within the computing system 108 are databases that store data with regard to the insured that can be used to determine policy coverage, policy terms, rating modifiers, deductible amounts and premiums. The computing system 108 and communication system 109 will be described in greater detail below with regard to FIG. 2.

A credit card company, financial institution or bank 120 can be a single, multiple or network of financial institutions that facilitates the transfer of money and funds between parties. For example, the credit card company or bank can be part of a credit card or debit card system that facilitates the wire transfer of funds between accounts. The transfer of funds can include currency exchanges and the like. The credit card company, financial institution or bank 120 can communicate with the insurance company 107 through a communication network 150.

The credit card company, financial institution or bank can issue payment devices 105 such as credit or debit cards that may be used to make purchases such as fuel from a fuel dispensing location or station. Alternatively, a fuel selling company 130 or the insurance company 107 may issue credit or debit cards. The fuel selling company 130 or the insurance company 107 may issue payment devices that are electronic such as a key tag that serve to identify the purchaser and issue a debit for the purchased amount.

The financial institution or bank 120 includes a computing system 122 and a communication system 124. The computing system includes a database, an accounting system, and a business rules system. Each of these systems can further include a storage system, an application system, and a server and can support multiple users at any given time. The systems can further include processors, which can be configured to a specific task, to execute application instructions on the data. The financial institution or bank network 120 can use a wide variety of communication devices to communicate with and exchange data with insurance company 107 and the fuel dispensing company 130.

Within the computing system 122 are databases that store data with regard to the insured that can be used to determine rating modifiers, payments and charges.

A credit card company, financial institution or bank 120 can be a single, multiple or network of financial institutions that facilitates the transfer of money and funds between parties. For example, the credit card company or bank can be part of a credit card or debit card system that facilitates the wire transfer of funds between accounts. The transfer of funds can include currency exchanges and the like. The credit card company, financial institution or bank 120 can communicate with the insurance company 107 through a communication network 150.

A fuel dispensing company 130 is a company that sells fuel such as gasoline, petro, diesel, ethanol, natural gas, or any other vehicle fuel from a fuel dispensing location or gas station. Fuel dispensing locations are typically located in every community in most cities, states, and countries. The fuel dispensing company 130 can issue payment devices 105 such as credit or debit cards that may be used to make purchases from a fuel dispensing location or station.

The fuel dispensing company 130 includes a computing system 132 and a communication system 134. The computing system includes a database, an accounting system, and a business rules system. Each of these systems can further include a storage system, an application system, and a server and can support multiple users at any given time. The systems can further include processors, which can be configured to a specific task, to execute application instructions on the data. The fuel dispensing company 130 can use a wide variety of communication devices to communicate with and exchange data with the credit card company, financial institution or bank 120 through communication network 152.

Within the computing system 132 are databases that store data with regard to the insured that can be used to determine rating modifiers, payments and charges.

The fuel dispensing company computer system 132 can track, record and generate fuel transaction data. The fuel transaction data can be transmitted over communication network 152 to the credit card company, financial institution or bank 120 and then be transmitted over communication network 150 to insurance company 107. The fuel transaction data can include cost of fuel purchased, amount of fuel purchased, type of fuel, date and time, location of fuel purchase, an odometer reading, driver identification and vehicle identification.

Regardless of which type of payment device 105 is used, the payment device 105 can transmit various insured party data to the fuel dispensing company computer system 132 using communication device 156 when payment device 105 is used. The insured party data can include name, account number, driver identification and vehicle identification.

A vehicle 160 such as a car or truck may communicate vehicle data to the fuel dispensing company computer system 132 through a communication network 162. Communication network 162 can include a wide variety of communication devices such as telemetry device (which can include telematic devices), global positioning system devices, radio frequency devices and cellular telephone devices. Telematic devices can be devices that use of navigation positioning system technology, e.g., Global Positioning System technology, integrated with computers and mobile communications technology in automotive navigation systems. The vehicle 160 can sense the signals from at least one of the navigational systems including a global navigation satellite system (GNSS) such as Global Positioning System (GPS), Beidou, COMPASS, Galileo, GLONASS, Indian Regional Navigational Satellite System (IRNSS), or QZSS. The vehicle can further use Real Time Kinematic (RTK) satellite navigation to provide the real-time corrections of the positioning signal down to a centimeter level of accuracy. The vehicle can include a receiver that receives differential correction signals in North American from the FAA's WAAS satellites. This positioning data can be communicated over the network 162. The vehicle data can include a wide variety of vehicle data such as an odometer reading, average speed, maximum speed, time of day the vehicle is operated, average engine revolutions per minute and maximum engine revolutions per minute. In an example, vehicle 160 can communicate an odometer reading to a gas pump with every fuel purchase. A sensor (not shown) can be located in the gas tank filling port to indicate that the vehicle is being fuelled. The sensor can be tied to the fuel level sensor in the fuel tank. In an example, the sensor is to sense opening the door covering the fuel port or the position of the cap on the fuel port. The vehicle data can be transmitted to the fuel dispensing company computer system 132 after receiving a signal from the sensor.

Figure 2:
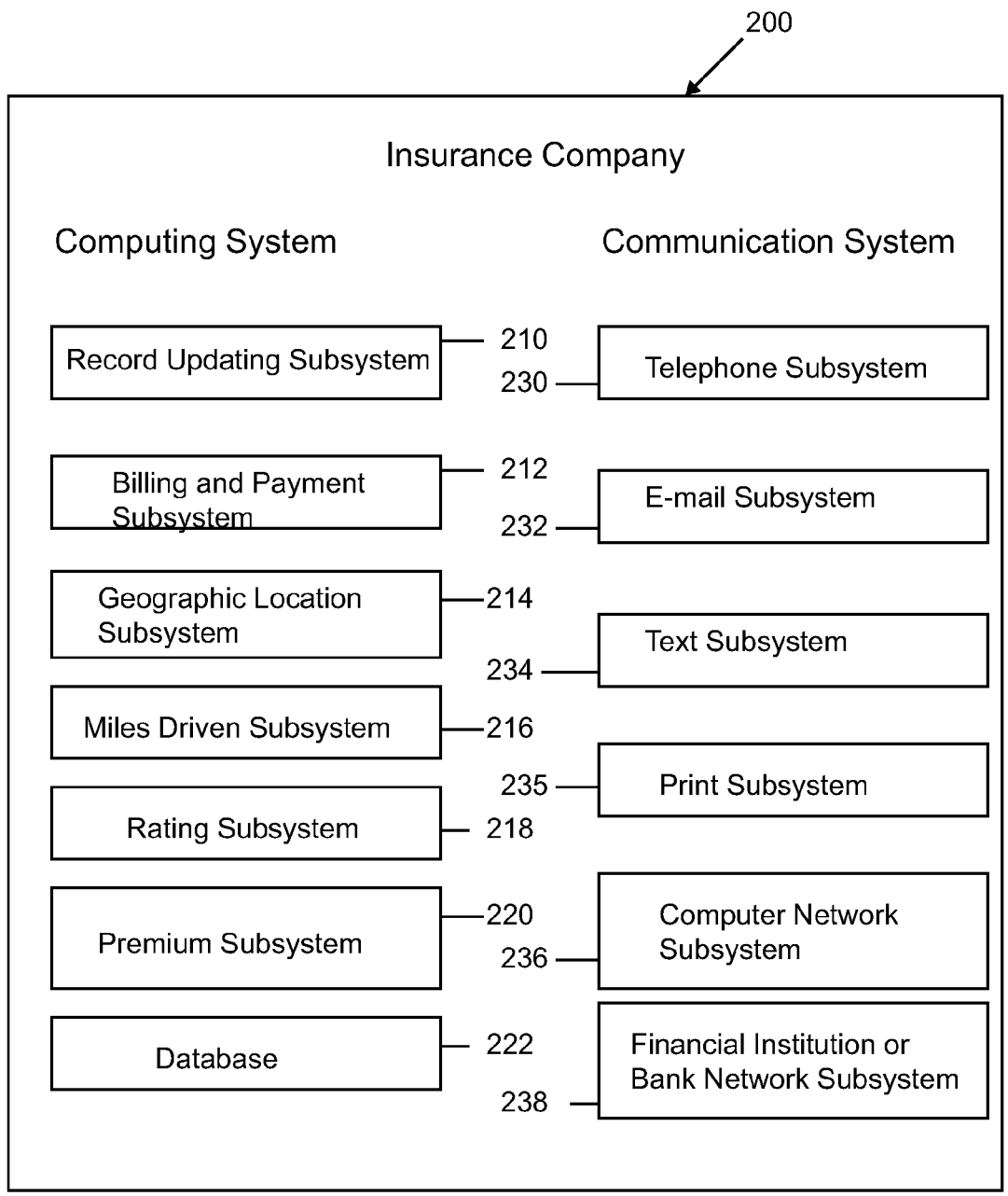
FIG. 2 is a schematic diagram of a company computing and communication system according to an example embodiment.

FIG. 2 illustrates a schematic view of a system 200 including various devices of the insurance company, e.g., 107 of FIG. 1. The insurance company system 200 includes a computing system and a communication system that can each include a plurality of subsystems that are information handling systems that execute processes and perform operations (e.g., processing or communicating information using processors) in response thereto, as discussed further below. Each such subsystem is formed by various electronic circuitry components. In an example, any of the components of the computing machine 1100 (FIG. 10) can be included in a subsystem. The subsystems can each communicate with each other over a bus system (not shown).

A record updating subsystem 210 provides an interface to a user to update data records related to a user. Subsystem 210 can provide a graphical user interface to a user to input data such as contact information, addresses, telephone numbers, secondary contact information, emergency numbers, contact for relatives whom that insured would contact in an emergency, e-mail addresses, text addresses, etc. The subsystem 210 can prompt the insured for this information at the time of applying for insurance or later. Further, subsystem 210 can prompt a telephone representative to request this information from the insured.

A billing and payment subsystem 212 generates insurance bills or invoices and keeps track of payments received, credits and debits accounts and maintains account balances for the insured party. Billing and payment subsystem 212 can cause invoices and account statements to be sent to the insured party. Billing and payment subsystem 212 can receive data on invoices, bills and payments. Billing and payment subsystem 212 can be configured to automatically receive bills and make payments from an account or may allow the insured party to direct payments through a communication device such as a graphical user interface. Subsystem 212 can access database 222 or can keep a database for each invoice or payment.

A geographic location subsystem 214 can determine a geographic location, area or region that an insured vehicle is operating in. Geographic location subsystem 214 can receive fuel transaction data over time from the fuel dispensing company 130 (FIG. 1) and determine a geographic area in which the insured vehicle operates. The geographic location is used by rating modification subsystem 218 and/or premium subsystem 220 to change or determine an insurance premium. Subsystem 214 can access database 222 or can keep a database of fuel transaction data for each insurance policy. Additional details on the operation of geographic subsystem 214 are disclosed in the description of FIGS. 4A-4C below.

Miles driven subsystem 216 can determine a number of miles driven by the insured vehicle during a period of time. Miles driven subsystem 216 can receive fuel transaction data from the fuel dispensing company 130 (FIG. 1) and determine the number of miles driven during a period of time. In an example, miles driven subsystem 216 can receive data about sequential fuel purchases at two different fuel stations and estimate the number of miles driven during the time between the fuel purchases. In an additional example, miles driven subsystem 216 can receive data about a fuel purchase and having data about the average miles per gallon for the vehicle; calculate the number of miles driven in a time period. In another example, miles driven subsystem 216 can receive data about odometer readings and directly calculate the number of miles driven during a time period.

In an example, miles driven subsystem 216 can also perform a miles per gallon calculation. Assume that the fuel transaction data contains an odometer reading and that a database accessed by subsystem 216 identifies the vehicle as having an 18 gallon gas tank. If 17 gallons are indicated as being purchased in the fuel transaction data, it can be assumed that the vehicle was filled up during the fuel purchase. If the difference of the previous odometer reading and the present odometer reading is 270 miles, the vehicle was recently operating at an average of 15 miles per gallon. If the average miles per gallon of the vehicle, as rated by the Environmental Protection Agency (EPA), are 20 miles per gallon, the vehicle is being driven at higher speeds or in an aggressive manner. In this example, a higher insurance premium may be charged to the insured party for these detrimental driving habits.

The number of miles driven during a time period is used by rating modification subsystem 218 and/or premium subsystem 220 to change or determine an insurance premium. Miles driven subsystem 216 can access database 222 or can keep a database of fuel transaction data for each insurance policy.

Miles driven subsystem 216 can also determine an average speed that the insurance vehicle is travelling using the distance between fuel stations or an odometer reading and the elapsed time between fuel purchases. If the average speed of the vehicle is greater than an average speed limit in the geographic area of the fuel stations, the driver is speeding or driving faster than the speed limit. Accordingly, a higher insurance premium may be charged due to the higher probability of an accident.

Rating subsystem 218 can determine one or more rate modifiers that are at least partially usage based for a vehicle insurance policy. Rating subsystem 218 can receive fuel transaction data, insurance policy data, data about the insured party, vehicle data, underwriting data and any other data that is necessary to change and modify an insurance rate. Rating subsystem 218 can use many different factors in combination to determine an overall insurance rate. For example, rating subsystem 218 can use geographic location, miles driven, vehicle type, driver age, driver history, claim history, deductible amounts, time of day during which driving occurs, average vehicle speed, etc.

Rating subsystem 218 can assign a rate factor and weight percentage to each data category. The total weight percentage of all the data categories can sum to one. In an example, the geographic location may count toward 20 percent of the total rate, the driver age 20 percent of the total rate, the miles driven in a time period 30 percent of the total rate and the driver claim history 30 percent of the total rate. Expressed as a formula:

$$R\text{total}=(0.2)(R\text{geographic})+(0.2)(R\text{age})+(0.3)(R\text{miles driven})+(0.3)(R\text{claim history})$$

In an example, rating subsystem 218 can determine in association with geographic location subsystem 214 that the insured vehicle is operating in an urban area that has a high auto theft rate. Accordingly, rating subsystem 218 can modify the insurance rate to account for the higher risk of a loss or claim.

In an example, rating subsystem 218 can determine in association with miles driven subsystem 216 that the insured vehicle is infrequently driven or used. Accordingly, rating subsystem 218 can modify the insurance rate to account for the lower risk of a loss or claim. Subsystem 218 can access database 222 or can keep a database of fuel transaction data and other data for each insurance policy. Rating subsystem 218 can be in communication with and exchange data with other subsystems such as subsystems 210, 212, 214, 216, 220 and database 222.

Premium subsystem 220 can determine a usage based insurance cost or premium for an insurance policy. Premium subsystem 220 may use or access a database of underwriting data such as risk factors, claim history, credit reports and criminal history. Premium subsystem 220 can use the underwriting data and past claim histories and claim payments to determine the value of the premium.

Premium subsystem 220 may also cause a bill or charge for the insurance to be sent out by various means. In an example, premium subsystem 220 may determine an insurance premium for a vehicle, add the premium to a fuel cost and communicate the premium and a total cost to a gas pump at the fuel dispensing company 130. The premium may be for a time period such as the next two weeks or may be for a certain number of miles driven such as the next 350 miles driven. Premium subsystem 220 generates a usage based premium or pay as you drive premium that is at least partially based on the amount or number of miles that a vehicle is driven.

Premium subsystem 220 can access database 222 or can keep a database of fuel transaction data and other data for each insurance policy. Premium subsystem 220 can be in communication with and exchange data with other subsystems such as subsystems 210, 212, 214, 216, 218 and database 222.

A database 222 stores the data for the insurance company and can include magnetic storage, optical storage, or electronic storage of data. The database 222 can include a wide variety of data such as underwriting, actuarial and risk management data.

A telephone subsystem 230 includes devices that can communicate thorough telephone systems, e.g., those based on "plain old telephone service" (POTS), Public Switched Telephone Network (PSTN), voice over IP (VOIP),), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, and others.

An e-mail subsystem 232 includes devices and systems that can send an e-mail communication to the insured at contacts stored in the database of the company.

A text subsystem 234 includes devices and systems that can send an electronic text communication to the insured at contacts stored in the database of the company.

A print subsystem 235 includes devices and systems that can print and send documents and statements to the insured at contacts stored in the database of the company.

A computer network subsystem 236 includes devices and systems that interface with other computer networks.

A financial institution or bank network subsystem 238 includes devices and systems that interface with credit card companies, financial institutions and banks using a secure network.

Figure 3:
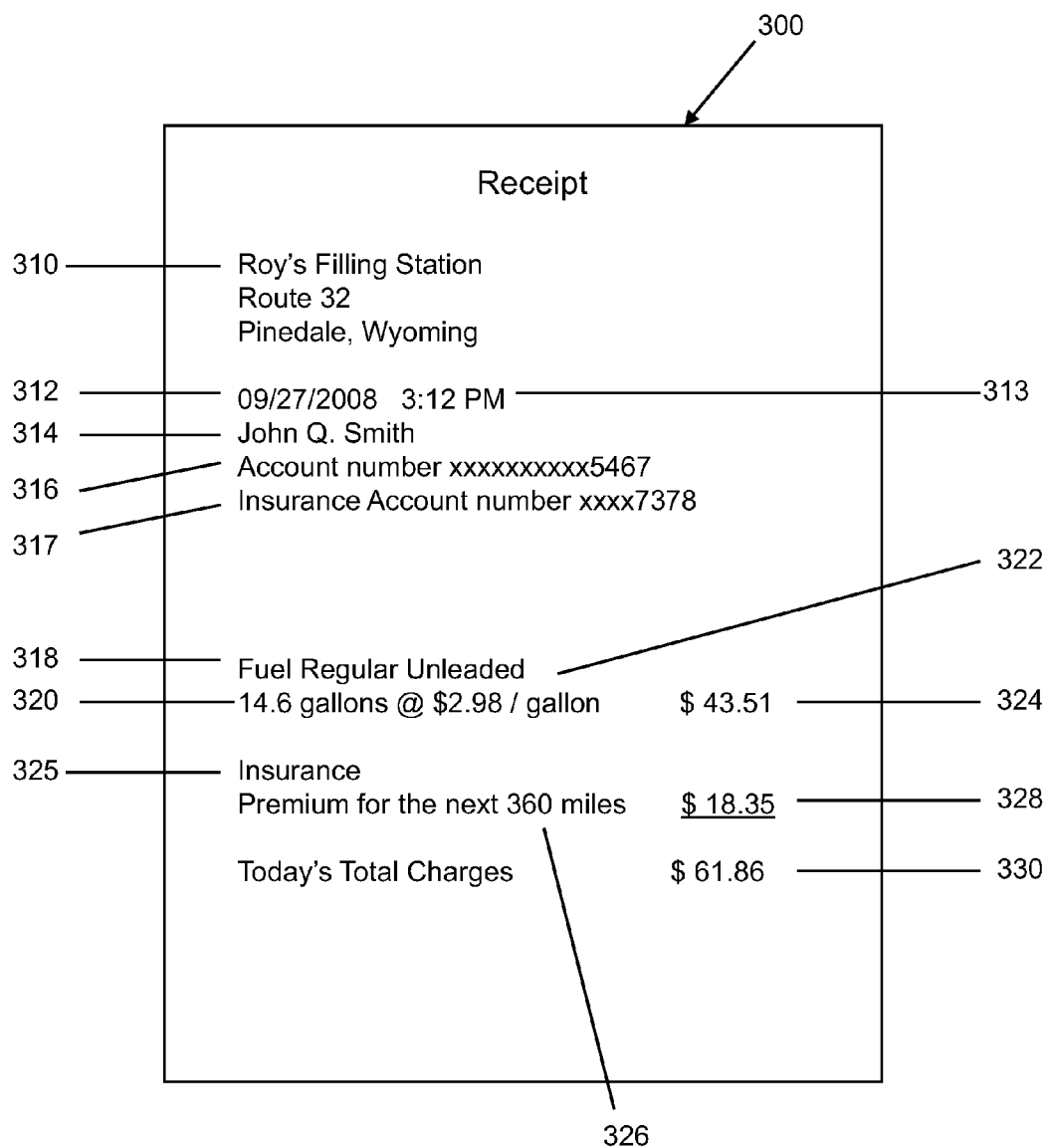
FIG. 3 is a schematic diagram of a fuel and insurance receipt according to an example embodiment.

FIG. 3 illustrates a fuel dispensing station receipt or a gas station receipt 300 that can be displayed on a graphical interface on a gas pump, stored in a database, or printed. Receipt 300 can be presented or shown to the insured party with each fuel and insurance purchase at a fuel dispensing station. Receipt 300 contains at least some fuel transaction data. Receipt 300 may also be transmitted to a mobile device such as a cell phone where it may be viewed by the insured party or may be added to a statement that is e-mailed or printed.

Receipt 300 includes fields 310-330 that represent data related to a fuel and insurance purchase. Field 310 represents the fuel dispensing station name and address/location. Field 312 represents the date of the fuel transaction. Field 313 represents the time of the fuel transaction. Field 314 represents the insured's name. Field 316 represents the insured's credit or debit account number, only the last four digits of which are shown for security purposes. Field 317 represents the insured's insurance account number, only the last four digits of which are shown for security purposes.

Field 318 represents the type of fuel purchased. Field 320 represents the amount of fuel purchased. Field 322 represents the cost per gallon of fuel. Field 324 represents the fuel cost. Field 325 represents the insurance premium. Field 326 represents the period that the vehicle insurance policy will be in effect in number of miles or a time period that the vehicle insurance will be in effect. Field 326 can be in miles, kilometers or can be in days, weeks, months or years. Field 328 represents the cost of the vehicle insurance premium. Field 330 represents the total cost of the fuel and the insurance premium that is charged to or deducted from the insured party's account. This is not an exhaustive list of all possible fields in the receipt.

Figure 4A:
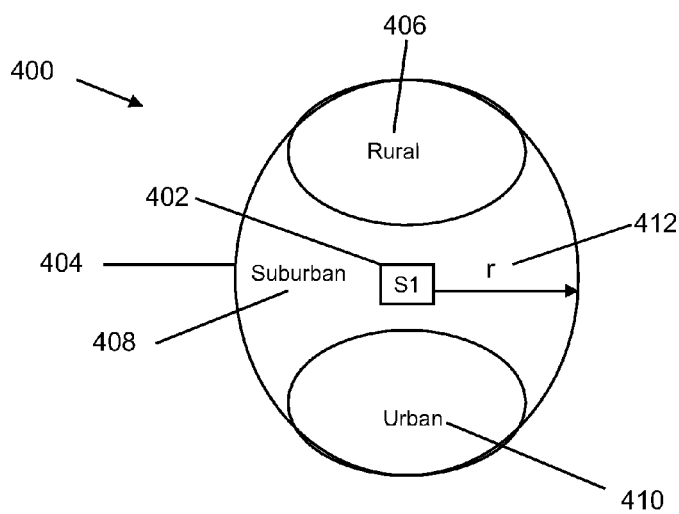
FIG. 4A is a schematic diagram of a driving area around a single fuel station according to an example embodiment.

FIG. 4A illustrates a schematic diagram 400 of determining a geographic location of a vehicle that can be used by geographic location subsystem 214 (FIG. 2). In FIG. 4A, it is assumed that the vehicle returns to the same fuel dispensing station 402 in order to re-fuel. This assumption can be confirmed using the fuel transaction data.

A fuel dispensing station 402 is located at the center of circular area 404. Circular area 404 represents the possible geographic areas or location in which the insured vehicle can be driven within a range of the gas station 402. Area 404 can be subdivided into a rural area 406, suburban area 408 and an urban area 410. Area 404 can be subdivided into more or less areas.

The range of the vehicle (Rv) in miles can be theoretically determined by taking the average miles per gallon (mpg) rating of the vehicle and multiplying by the fuel tank capacity of the vehicle (Cv).

$$Rv=(mpg)(Cv)$$

Alternatively, the range may be an actual range if the fuel transaction data includes an odometer reading. The vehicle range divided by two gives the radius (r) 412 of circular area 404.

$$Rv/2=r$$

From the location of fuel dispensing station 402 at the center of circular area 404, the percentage of rural, urban and suburban area driving can be computed using conventional area determining methods. In an example, the vehicle may be driven in a rural area 30 percent, in an urban area 30 percent and in a suburban area 40 percent. Each geographic location can have a different insurance rate modifier depending upon the claim history for each area. For example, rural areas can have lower accident rates than urban areas resulting in a lower rate factor being assigned to rural driving. A rate factor is assigned to each area; rural, urban and suburban. The overall geographic rate factor is equal to the sum of each area rate factor multiplied by the driving area percentage.

$$\text{Overall geographic rate factor}=\text{rural rate factor}(\%\text{ rural driving})+\text{urban rate factor}(\%\text{ urban driving})+\text{suburban rate factor}(\%\text{ suburban driving})$$

The overall geographic rate factor can be used by rating subsystem 218 (FIG. 2) and/or premium subsystem 220 (FIG. 2) to determine an insurance premium.

Figure 4B:
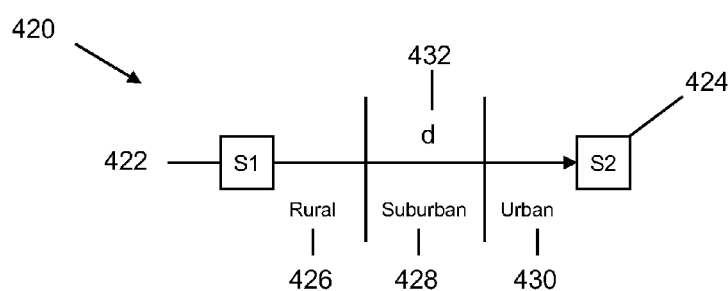
FIG. 4B is a schematic diagram of a point to point driving area between two fuel stations according to an example embodiment.

FIG. 4B illustrates a schematic diagram 420 of determining a geographic location of a vehicle that can be used by geographic location subsystem 214 (FIG. 2). In FIG. 4B, it is assumed that the vehicle is travelling between two different fuel dispensing stations 422 and 424 in order to re-fuel. This assumption can be confirmed using the fuel transaction data. If the distance traveled is greater than the vehicle range, then the distance traveled can be assumed to be point to point.

Fuel dispensing station 422 is located at one end of the distance traveled (d) 432 and fuel dispensing station 424 is located at the other end. Distance 432 can be subdivided into a rural portion 426, suburban portion 428 and an urban portion 430. Distance 432 can be subdivided into more or less areas.

From the location of distance 432, the percentage of rural, urban and suburban driving can be computed using conventional methods. In an example, the vehicle may be driven in a rural area 30 percent, in an urban area 30 percent and in a suburban area 40 percent. Each geographic location can have a different insurance rate modifier depending upon the claim history for each area. For example, rural areas can have lower accident rates than urban areas resulting in a lower rate factor being assigned to rural driving. A rate factor is assigned to each area; rural, urban and suburban. The overall geographic rate factor is equal to the sum of each area rate factor multiplied by the driving area percentage.

Overall geographic rate factor=rural rate factor(% rural driving)+urban rate factor(% urban driving)+suburban rate factor(% suburban driving)

The overall geographic rate factor can be used by rating subsystem 218 (FIG. 2) and/or premium subsystem 220 (FIG. 2) to determine an insurance premium.

Figure 4C:
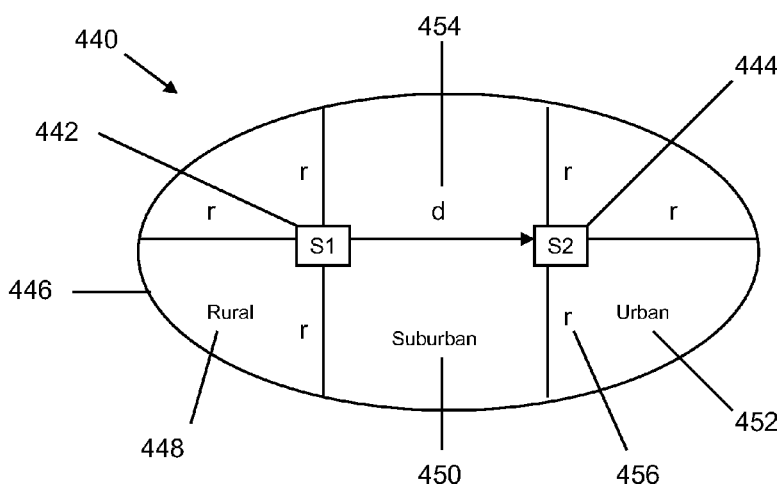
FIG. 4C is a schematic diagram of a driving area around two fuel stations according to an example embodiment.

FIG. 4C illustrates a schematic diagram 440 of determining a geographic location of a vehicle that can be used by geographic location subsystem 214 (FIG. 2). In FIG. 4C, the vehicle uses two sequentially different fuel dispensing stations 442 and 444 in order to re-fuel. If the distance traveled is less than the vehicle range, then the distance traveled can be assumed to be in an oval shaped area about the fuel stations. This assumption can be confirmed using the fuel transaction data.

Fuel dispensing station 442 is located toward one end of elliptical or oval shaped area 446. Oval shaped area 446 represents the possible geographic areas or location in which the insured vehicle can be driven. Area 446 can be subdivided into a rural area 448, suburban area 450 and an urban area 452. Area 446 can be subdivided into more or less areas.

The range of the vehicle (Rv) in miles can be theoretically determined by taking the average miles per gallon (mpg) rating of the vehicle and multiplying by the fuel tank capacity of the vehicle (Cv).

$$Rv=(mpg)(Cv)$$

Alternatively, the range may be an actual range if the fuel transaction data includes an odometer reading.

The vehicle range minus the distance 454 between the fuel stations gives the radii (r) 456 of oval shaped area 446.

$$Rv-d=r$$

The percentage of rural, urban and suburban area driving can be computed using conventional area determining methods. In an example, the vehicle may be driven in a rural area 30 percent, in an urban area 30 percent and in a suburban area 40 percent. Each geographic location can have a different insurance rate modifier depending upon the claim history for each area. For example, rural areas can have lower accident rates than urban areas resulting in a lower rate factor being assigned to rural driving. A rate factor is assigned to each area, rural, urban and suburban. The overall geographic rate factor is equal to the sum of each area rate factor multiplied by the driving area percentage.

Overall geographic rate factor=rural rate factor(% rural driving)+urban rate factor(% urban driving)+suburban rate factor(% suburban driving)

The overall geographic rate factor can be used by rating subsystem 218 (FIG. 2) and/or premium subsystem 220 (FIG. 2) to determine an insurance premium.

Figure 5:
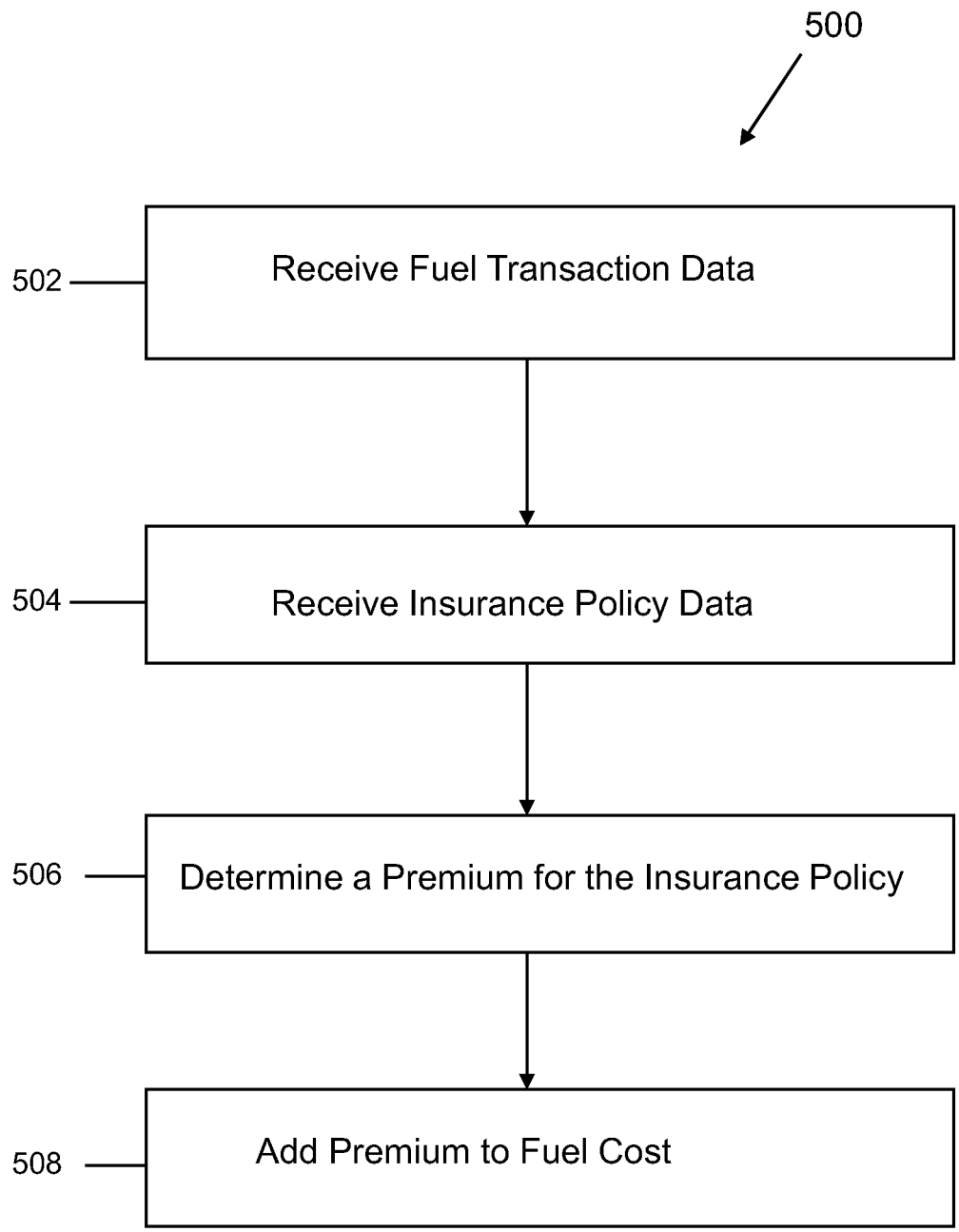
FIG. 5 is a flow chart of a method according to an example embodiment.

FIG. 5 illustrates a flow chart of a method 500 for providing usage based vehicle insurance or pay as you drive vehicle insurance. This method provides insurance to an insured driving party.

At 502, fuel transaction data is received. The fuel transaction data can include data received directly from a fuel dispensing company or through a financial services provider such as a credit card company or bank. The fuel transaction data can include data retrieved from a database of past fuel transactions.

The fuel transaction data can include information such as the fuel dispensing station name and address/location, the date of the fuel transaction and the time of the fuel transaction. The fuel transaction data can further include the insured's name and address, credit or debit account number and insurance account number. The fuel transaction data can further include the type of fuel purchased, the amount of fuel purchased, the cost per gallon of fuel and the fuel cost. In addition, the fuel transaction data can include the period that the vehicle insurance policy will be in effect in number of miles or a time period that the vehicle insurance will be in effect, the cost of the vehicle insurance premium and the total cost of the fuel and the insurance premium.

The fuel transaction data can further include data retrieved from a database of past fuel transactions such as the previous location of fuel purchases and the amount of prior fuel purchased. The fuel transaction data can further include data from the vehicle being fueled such as an odometer reading, average speed, maximum speed, time of day the vehicle is operated, average engine revolutions per minute and maximum engine revolutions per minute. The fuel transaction data can further include data retrieved from a credit or debit card such as the identification of the vehicle and the operator of the vehicle. In an embodiment, a credit or debit card can be issued to each driver for each vehicle that is insured by the insured party.

The data received at step 502 can be stored in an database or electronic memory device and used for other steps and systems so that additional computations can occur. Storage can be in the company database, for example, in electronic memory devices.

At 504, insurance policy data is received. The insurance policy data can include data received directly from the insured party or from data retrieved from the insurance company database. The insurance policy data can include type of policy, covered property and items, terms of the insurance, time periods of coverage, amounts of deductible and loss limits. The insurance policy data can further include data used for underwriting such as vehicle type, driver age, driver occupation, driver education, risk factors, claim history and credit reports.

At 506, the premium or cost of the insurance policy for the insured driver and vehicle is calculated or determined. The premium can be determined using the insurance company computer system 108 (FIG. 1) and database 222 (FIG. 2). In an embodiment, the insurance company computer system can at least use a portion of the fuel transaction data such as number of miles driven, vehicle usage or geographic location to determine the value of the premium. The premium can be determined for a future time period such as two weeks from the date of the present fuel purchase or for a future number of miles driven such as 350 miles. Step 506 generates a usage based insurance premium or pay as you drive insurance premium that is at least partially based on the amount or number of miles that a vehicle is driven. In step 506, the insurance premium is determined for intervals that occur between every fuel purchase.

At 508, the insurance premium is added to the fuel cost. The cost of the insurance premium is added to the cost of the fuel purchased at the fuel dispensing station to obtain a total cost or amount. The total cost of fuel and insurance is charged or debited to an account of the insured party through a credit card company or bank 120 (FIG. 1). The total cost of fuel and insurance can then be communicated to the insured party. In an example, the cost of fuel and insurance premium can be displayed at the fuel dispensing location and printed on a receipt. The receipt can indicate the period or number of miles that the insurance policy is in effect for and can serve as proof of vehicle insurance.

In another example, the insured party can initially instruct the insurance company computer system to charge a credit card or pay from an account all recurring usage based insurance premiums that are incurred from fuel dispensing locations. In another example, the insurance company computer system can send a message to a mobile device of the insured party such as a cell phone displaying the usage based insurance premium and requesting the insured party to accept the charges for the premium. The insurance premium would then be charged to a credit card or paid from a previously established account.

The use of usage based vehicle insurance with premiums paid at the gas station has several advantages. First, the premium amounts are paid more frequently in smaller amounts creating fewer problems for the insurance party to make the payment. Second, if all drivers are required to buy insurance at fueling stations, the problem of uninsured drivers would be eliminated. Third, by basing the premium at least partially on the actual amount of driving, the actual geographic driving location and the actual driver of the vehicle, a more accurate risk profile and premium can be determined for the insured party. The appropriate premium can be generated in regards to the risk of an insurance claim or loss.

Figure 6:
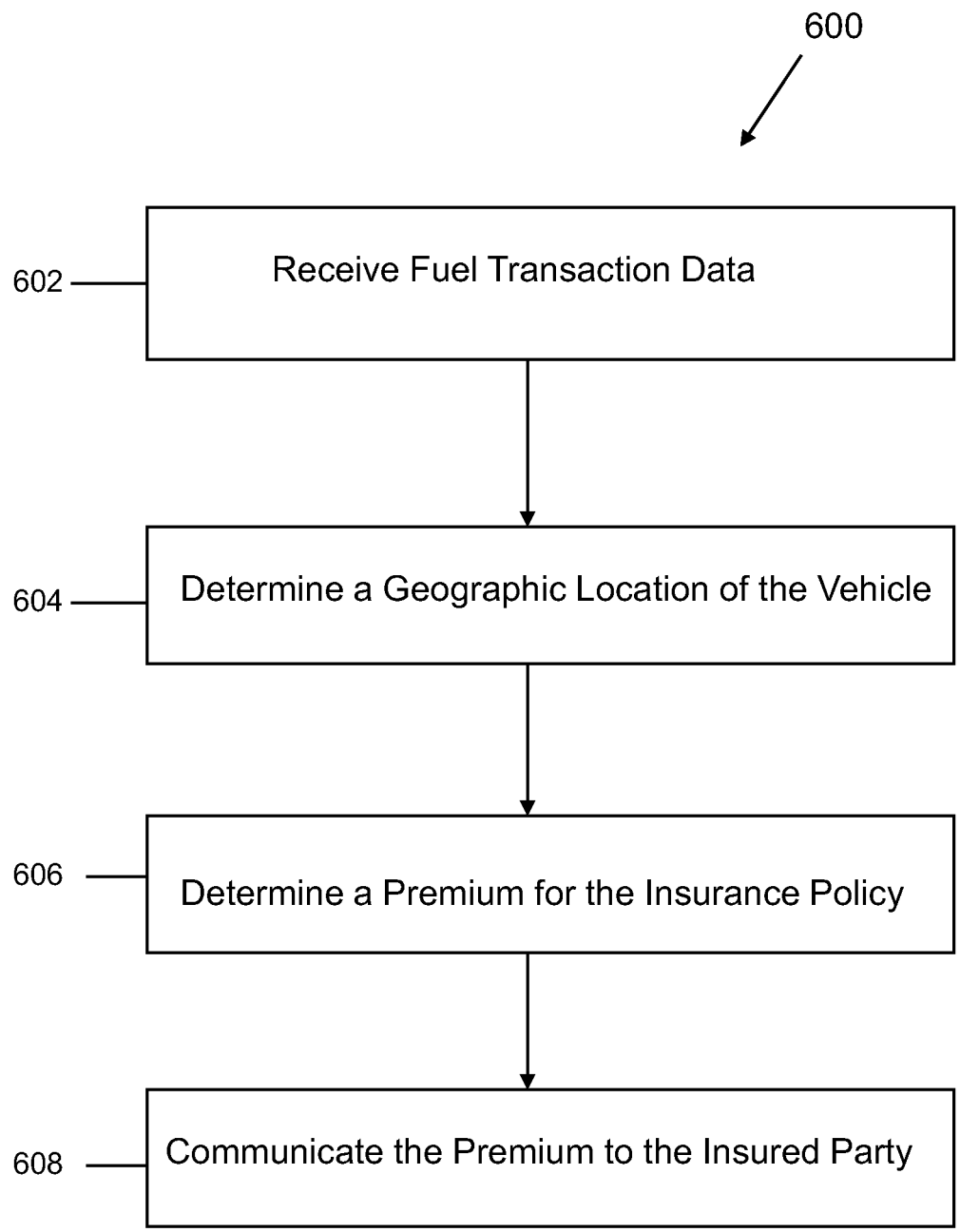
FIG. 6 is a is a flow chart of a method according to an example embodiment.

FIG. 6 illustrates a flow chart of a method 600 for providing usage based vehicle insurance or pay as you drive vehicle insurance. This method provides insurance to an insured driving party.

At 602, fuel transaction data is received. The fuel transaction data can include data received directly from a fuel dispensing company or through a financial services provider such as a credit card company or bank. The fuel transaction data can include data retrieved from a database of past fuel transactions.

The fuel transaction data can include information such as the fuel dispensing station name and address/location, the date of the fuel transaction and the time of the fuel transaction. The fuel transaction data can further include the insured's name and address, credit or debit account number and insurance account number. The fuel transaction data can further include the type of fuel purchased, the amount of fuel purchased, the cost per gallon of fuel and the fuel cost. In addition, the fuel transaction data can include the period that the vehicle insurance policy will be in effect in number of miles or a time period that the vehicle insurance will be in effect, the cost of the vehicle insurance premium and the total cost of the fuel and the insurance premium.

The fuel transaction data can further include data retrieved from a database of past fuel transactions such as the previous location of fuel purchases and the amount of prior fuel purchase. The fuel transaction data can further include data from the vehicle being fueled such as an odometer reading, average speed, maximum speed, time of day the vehicle is operated, average engine revolutions per minute and maximum engine revolutions per minute. The fuel transaction data can further include data retrieved from a credit or debit card such as the identification of the vehicle and the operator of the vehicle. In an embodiment, a credit or debit card can be issued to each driver for each vehicle that is insured by the insured party.

The data received at step 602 can be stored in an database or electronic memory device and used for other steps and systems so that additional computations can occur. Storage can be in the company database, for example, in electronic memory devices.

At 604, a geographic location or operating area of the vehicle is determined. Step 604 can be performed using geographic location subsystem 214 (FIG. 2). The geographic location, area or region that an insured vehicle is operating in can be determined from the fuel transaction data. The fuel transaction data can indicate a geographic location where fuel purchases are made. Over time, a database of these locations can be saved in the insurance company computer system database and can be used to determine the geographic operating area of the vehicle In an example, step 604 can determine a percentage of rural, urban and suburban area driving using the fuel transaction data. The insured vehicle may be driven in a rural area 30 percent, in an urban area 30 percent and in a suburban area 40 percent. Additional details on determining the geographic location of an insured vehicle are disclosed with regards to the description of FIGS. 4A-4C.

At 606, the premium or cost of the insurance policy for the insured driver and vehicle is calculated or determined. The premium can be determined using the insurance company computer system 108 (FIG. 1) and database 222 (FIG. 2). In an embodiment, the insurance company computer system can at least use a portion of the fuel transaction data such as number of miles driven, vehicle usage or geographic location to determine the value of the premium. The premium can be determined for a future time period such as two weeks from the date of the present fuel purchase or for a future number of miles driven such as 350 miles.

In an example, method 600 can assign each geographic location a different insurance rate modifier depending upon the claim history for each area. For example, rural areas can have lower accident rates than urban areas resulting in a lower rate factor being assigned to rural driving. A rate factor is assigned to each area, rural, urban and suburban. An overall geographic rate factor can then be determined. The overall or total geographic rate factor is equal to the sum of each area rate factor multiplied by the driving area percentage. The total geographic rate factor can be used along with other rate factors to determine the insurance premium.

Step 606 generates a usage based insurance premium or pay as you drive insurance premium that is at least partially based on the geographic area that the vehicle is operated in.

At 608, the insurance premium is communicated to the insured party. In an example, the cost of the insurance premium can be displayed at the fuel dispensing location or gas pump and printed on a receipt. The receipt can indicate the time period or number of miles that the insurance policy is in effect for and can serve as proof of vehicle insurance. After the premium has been communicated to the insured party, the insured party would have the option of paying or purchasing the insurance policy. In an example, the insured party can pay the premium at the fuel dispensing station using a credit or debit card or can pay the premium using a payment device issued by the insurance company.

Basing the vehicle insurance premium at least partially on the actual geographic driving area, a more accurate risk profile and premium can be determined for the insured party. The appropriate premium can be generated in regards to the risk of an insurance claim or loss.

Figure 7:
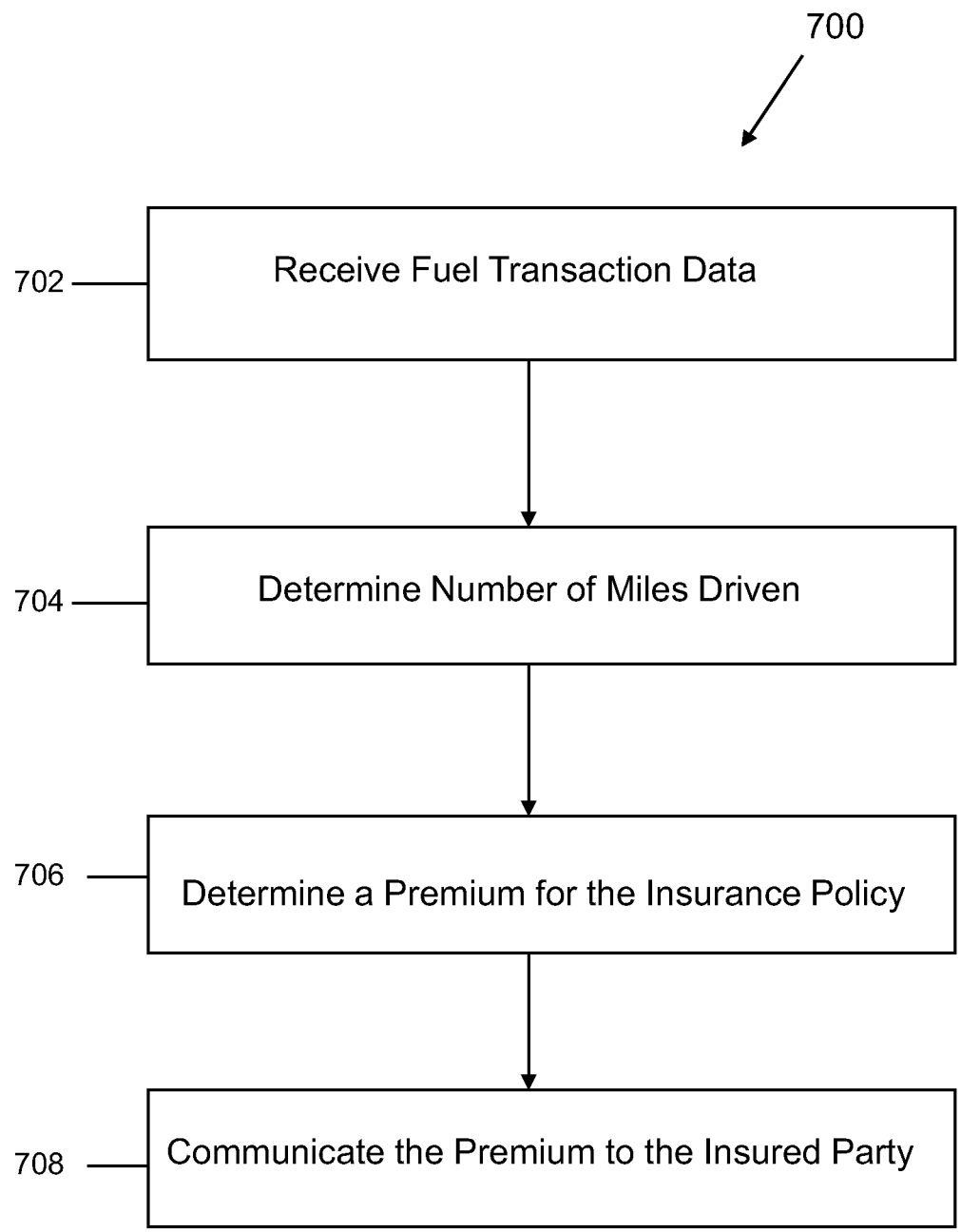
FIG. 7 is a is a flow chart of a method according to an example embodiment.

FIG. 7 illustrates a flow chart of a method 700 for providing usage based vehicle insurance or pay as you drive vehicle insurance. This method provides insurance to an insured driving party.

At 702, fuel transaction data is received. The fuel transaction data can include data received directly from a fuel dispensing company or through a financial services provider such as a credit card company or bank. The fuel transaction data can include data retrieved from a database of past fuel transactions.

The fuel transaction data can include information such as the fuel dispensing station name and address/location, the date of the fuel transaction and the time of the fuel transaction. The fuel transaction data can further include the insured's name and address, credit or debit account number and insurance account number. The fuel transaction data can further include the type of fuel purchased, the amount of fuel purchased, the cost per gallon of fuel and the fuel cost. In addition, the fuel transaction data can include the period that the vehicle insurance policy will be in effect in number of miles or a time period that the vehicle insurance will be in effect, the cost of the vehicle insurance premium and the total cost of the fuel and the insurance premium.

The fuel transaction data can further include data retrieved from a database of past fuel transactions such as the previous location of fuel purchases and the amount of prior fuel purchased. The fuel transaction data can further include data from the vehicle being fueled such as an odometer reading, average speed, maximum speed, time of day the vehicle is operated, average engine revolutions per minute and maximum engine revolutions per minute. The fuel transaction data can further include data retrieved from a credit or debit card such as the identification of the vehicle and the operator of the vehicle. In an embodiment, a credit or debit card can be issued to each driver for each vehicle that is insured by the insured party.

The data received at step 702 can be stored in a database or electronic memory device and used for other steps and systems so that additional computations can occur. Storage can be in the company database, for example, in electronic memory devices.

At 704, the number of miles that the insured vehicle is driven in a time period is determined. Step 704 can be performed using miles driven subsystem 216 (FIG. 2). The number of miles driven by the insured vehicle during a period of time can be determined using the fuel transaction data. The fuel transaction data can indicate a geographic location where fuel purchases are made. Over time, a database of these locations can be saved in the insurance company computer system database and can be used to determine the number of miles in a time period that the vehicle is being driven or operated.

In an example, step 704 can receive data about sequential fuel purchases at two different fuel stations and estimate the number of miles driven during the time between the fuel purchases. In an additional example, step 704 can receive data about a fuel purchase and having data about the average miles per gallon for the vehicle; calculate the number of miles driven in a time period. In another example, step 704 can receive data about odometer readings and directly calculate the number of miles driven during a time period.

At 706, the premium or cost of the insurance policy for the insured driver and vehicle is calculated or determined. The premium can be determined using the insurance company computer system 108 (FIG. 1) and database 222 (FIG. 2). In an embodiment, the insurance company computer system can at least use a portion of the fuel transaction data such as number of miles driven, vehicle usage or geographic location to determine the value of the premium. The premium can be determined for a future time period such as two weeks from the date of the present fuel purchase or for a future number of miles driven such as 350 miles.

In an example, method 700 can assign a rate modifier based upon the number of miles driven during a time period. A small number of miles driven in a time period can be associated with lower accident rates than driving a large number of miles in a time period. A mileage rate factor can be assigned to the number of miles driven in a time period and used along with other rate factors to determine the insurance premium. Step 706 generates a usage based insurance premium or pay as you drive insurance premium that is at least partially based on the number of miles that a vehicle operates.

At 708, the insurance premium is communicated to the insured party. In an example, the cost of the insurance premium can be displayed at the fuel dispensing location or gas pump and printed on a receipt. The receipt can indicate the time period or number of miles that the insurance policy is in effect for and can serve as proof of vehicle insurance. After the premium has been communicated to the insured party, the insured party would have the option of paying or purchasing the insurance policy. In an example, the insured party can pay the premium at the fuel dispensing station using a credit or debit card or can pay the premium using a payment device issued by the insurance company.

Basing the vehicle insurance premium at least partially on the number of miles driven provides a more accurate risk profile and premium for the insured party. The appropriate premium can be generated in regards to the risk of an insurance claim or loss.

Figure 8:
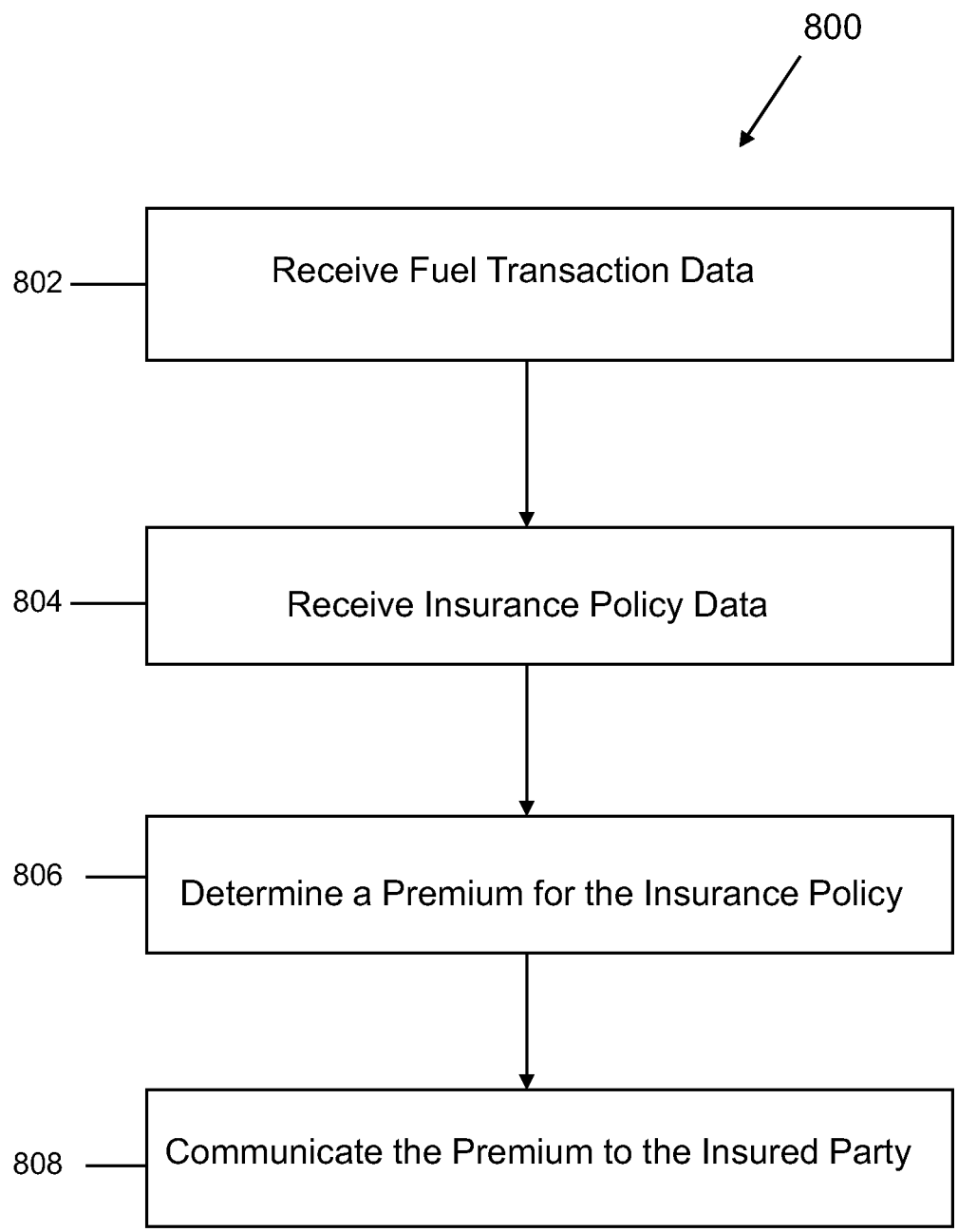
FIG. 8 is a flow chart of a method according to an example embodiment.

FIG. 8 illustrates a flow chart of a method 800 for providing usage based vehicle insurance or pay as you drive vehicle insurance. This method provides insurance to an insured driving party.

At 802, fuel transaction data is received. The fuel transaction data can include data received directly from a fuel dispensing company or through a financial services provider such as a credit card company or bank. The fuel transaction data can include data retrieved from a database of past fuel transactions.

The fuel transaction data can include information such as the fuel dispensing station name and address/location, the date of the fuel transaction and the time of the fuel transaction. The fuel transaction data can further include the insured's name and address, credit or debit account number and insurance account number. The fuel transaction data can further include the type of fuel purchased, the amount of fuel purchased, the cost per gallon of fuel and the fuel cost. In addition, the fuel transaction data can include the period that the vehicle insurance policy will be in effect in number of miles or a time period that the vehicle insurance will be in effect, the cost of the vehicle insurance premium and the total cost of the fuel and the insurance premium.

The fuel transaction data can further include data retrieved from a database of past fuel transactions such as the previous location of fuel purchases and the amount of prior fuel purchased. The fuel transaction data can further include data from the vehicle being fueled such as an odometer reading, average speed, maximum speed, time of day the vehicle is operated, average engine revolutions per minute and maximum engine revolutions per minute. The fuel transaction data can further include data retrieved from a credit or debit card such as the identification of the vehicle and the operator of the vehicle. In an embodiment, a credit or debit card can be issued to each driver for each vehicle that is insured by the insured party.

The data received at step 802 can be stored in a database or electronic memory device and used for other steps and systems so that additional computations can occur. Storage can be in the company database, for example, in electronic memory devices.

At 804, insurance policy data is received. The insurance policy data can include data received directly from the insured party or from data retrieved from the insurance company database. The insurance policy data can include type of policy, covered property and items, terms of the insurance, time periods of coverage, amounts of deductible and loss limits. The insurance policy data can further include data used for underwriting such as vehicle type, driver age, driver occupation, driver education, risk factors, claim history and credit reports.

At 806, the premium or cost of the insurance policy for the insured driver and vehicle is calculated or determined. The premium can be determined using the insurance company computer system 108 (FIG. 1) and database 222 (FIG. 2). In an embodiment, the insurance company computer system can at least use a portion of the fuel transaction data such as number of miles driven, vehicle usage or geographic location to determine the value of the premium. The premium can be determined for a future time period such as two weeks from the date of the present fuel purchase or for a future number of miles driven such as 350 miles. Step 806 generates a usage based insurance premium or pay as you drive insurance premium that is at least partially based on the amount or number of miles that a vehicle is driven. In step 806, the insurance premium is determined for intervals that occur between every fuel purchase.

At 808, the insurance premium is communicated to the insured party. In an example, the cost of the insurance premium can be displayed at the fuel dispensing location or gas pump and printed on a receipt. The receipt can indicate the period or number of miles that the insurance policy is in effect for and can serve as proof of vehicle insurance. In another example, the insurance premium may be communicated in an e-mail or through a statement that is printed to the insured party. In an example, the charge for the insurance premium may be separate from any fuel charges or payments.

After the insurance premium has been communicated, the insured party has the option of purchasing the insurance policy. The insured party can initially instruct the insurance company computer system to charge a credit card or pay from an account all recurring usage based insurance premiums that are incurred from fuel dispensing locations. In another example, the insurance company computer system can send a message to a mobile device of the insured party such as a cell phone displaying the usage based insurance premium and requesting the insured party to accept the charges for the premium. The insurance premium would then be charged to a credit card or paid from a previously established account.

At the same time that the insurance premium is paid the cost of the fuel can also be paid. In an example, the cost of fuel purchased can be added to the insurance premium to obtain a total amount that is then charged or debited from an account of the insured party. The total cost of fuel and insurance is charged or debited to an account of the insured party through a credit card company or bank 120 (FIG. 1).

The use of usage based vehicle insurance with premiums paid at the gas station has several advantages. First, the premium amounts are paid more frequently in smaller amounts creating fewer problems for the insurance party to make the payment. Second, if all drivers are required to buy insurance at fueling stations, the problem of uninsured drivers would be eliminated. Third, by basing the premium at least partially on the actual amount of driving, the actual geographic driving location and the actual driver of the vehicle, a more accurate risk profile and premium can be determined for the insured party. The appropriate premium can be generated in regards to the risk of an insurance claim or loss.

Figure 9:
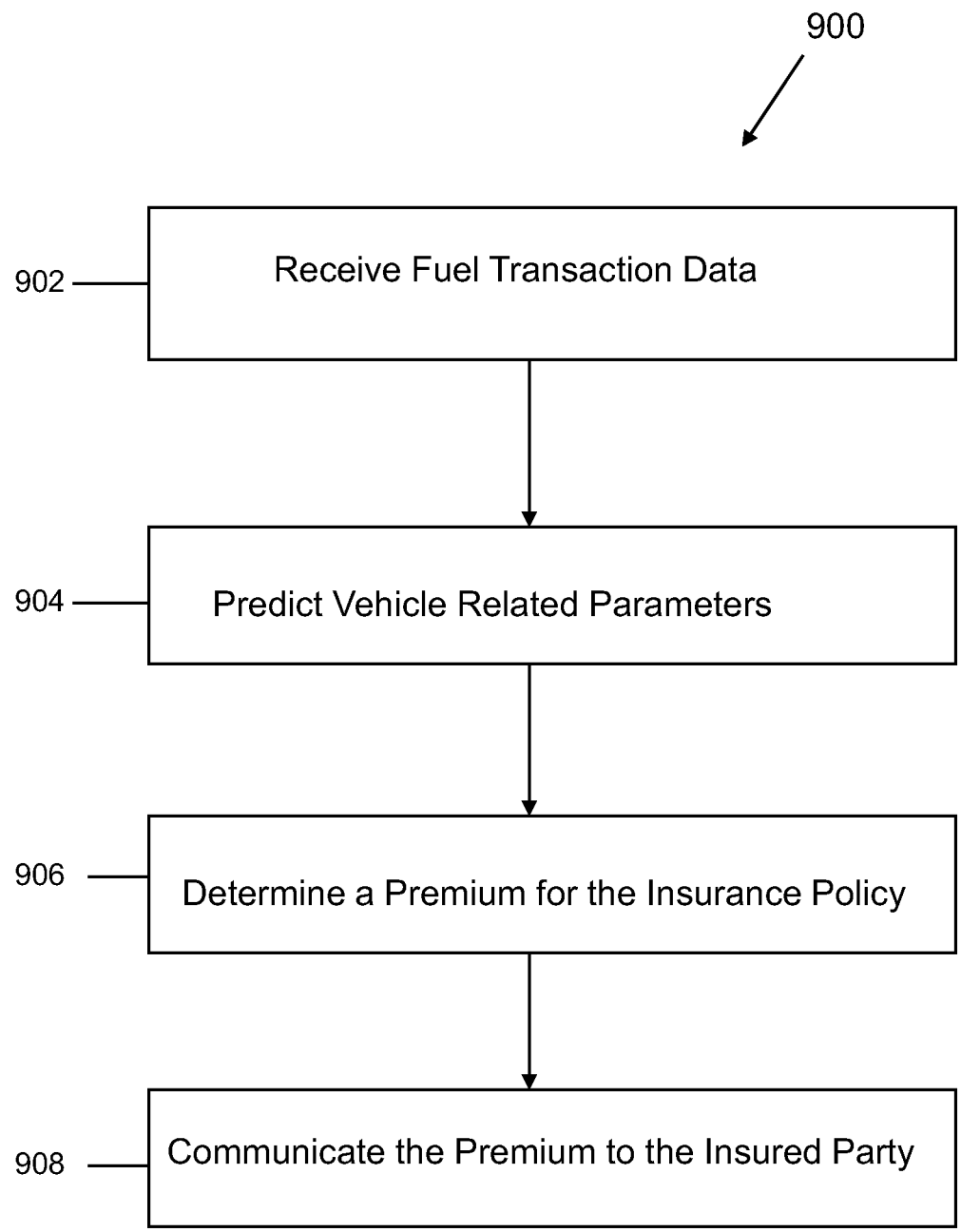
FIG. 9 is a flow chart of a method according to an example embodiment.

FIG. 9 illustrates a flow chart of a method 900 for providing usage based vehicle insurance or pay as you drive vehicle insurance. This method provides insurance to an insured driving party.

At 902, fuel transaction data is received. The fuel transaction data can include data received directly from a fuel dispensing company or through a financial services provider such as a credit card company or bank. The fuel transaction data can include data retrieved from a database of past fuel transactions.

The fuel transaction data can include information such as the fuel dispensing station name and address/location, the date of the fuel transaction and the time of the fuel transaction. The fuel transaction data can further include the insured's name and address, credit or debit account number and insurance account number. The fuel transaction data can further include the type of fuel purchased, the amount of fuel purchased, the cost per gallon of fuel and the fuel cost. In addition, the fuel transaction data can the period that the vehicle insurance policy will be in effect in number of miles or a time period that the vehicle insurance will be in effect, the cost of the vehicle insurance premium and the total cost of the fuel and the insurance premium.

The fuel transaction data can further include data retrieved from a database of past fuel transactions such as the previous location of fuel purchases and the amount of prior fuel purchase. The fuel transaction data can further include data from the vehicle being fueled such as an odometer reading, average speed, maximum speed, time of day the vehicle is operated, average engine revolutions per minute and maximum engine revolutions per minute. The fuel transaction data can further include data retrieved from a credit or debit card such as the identification of the vehicle and the operator of the vehicle. In an embodiment, a credit or debit card can be issued to each driver for each vehicle that is insured by the insured party.

The data received at step 902 can be stored in a database or electronic memory device and used for other steps and systems so that additional computations can occur. Storage can be in the company database, for example, in electronic memory devices.

At 904, vehicle related parameters are predicted. The vehicle related parameters can be parameters that are predicted to occur in the future. The vehicle related parameters are predicted using one or more of the following: insurance company computer system 108 (FIG. 1), geographic location subsystem 214, miles driven subsystem 216, rating subsystem 118 and database 222 (all in FIG. 2). In an embodiment, the insurance company computer system can at least use a portion of the fuel transaction data such as number of miles driven, vehicle usage or geographic location to predict the vehicle related parameters for a future time period. The vehicle related parameters can include future travel area, future number of miles driven, future drivers and future average speed. Other vehicle related parameters in addition to those listed can be predicted.

In an example, the fuel transaction data can be analyzed using computer routines to predict the future travel area of the insured vehicle. If the fuel transaction data is analyzed to show that past vehicle operation is in an urban area for three weeks per month and in a rural area one week per month, the future geographic area of operation of the vehicle can be predicted using a computer programmed with appropriate software.

In an example, the fuel transaction data can be analyzed using computer routines to predict the future number of miles driven in a time period by the insured vehicle. If the fuel transaction data is analyzed to show that in the past, the vehicle is driven the first week of the month 920 miles and the last three weeks of the month 270 miles, the future number of miles driven in a time period can be predicted using a computer programmed with appropriate software.

In an example, the fuel transaction data can be analyzed using computer routines to predict the average vehicle speed in a time period by the insured vehicle. If the fuel transaction data is analyzed to show that in the past, the vehicle is driven at an average speed of 48 miles per hour, the future average speed can be predicted using a computer programmed with appropriate software.

At 906, the premium or cost of the insurance policy for the insured driver and vehicle is calculated or determined using the predicted vehicle related parameters. The premium can be determined using the insurance company computer system 108 (FIG. 1), premium subsystem 220 and database 222 (FIG. 2).

In an embodiment, the insurance company computer system can at least use a portion of the predicted vehicle related parameters as determined in step 904 to determine the value of the insurance premium. The insurance premium can be determined at least partially using the predicted future travel area, future number of miles driven, future drivers and future average speed.

The insurance premium can be determined for a future time period such as two weeks from the date of the present fuel purchase or for a future number of miles driven such as 350 miles.

At 908, the insurance premium is communicated to the insured party. In an example, the cost of the insurance premium can be displayed at the fuel dispensing location or gas pump and printed on a receipt. The receipt can indicate the period or number of miles that the insurance policy is in effect for and can serve as proof of vehicle insurance.

After the insurance premium has been communicated, the insured party has the option of purchasing the insurance policy. The insured party can initially instruct the insurance company computer system to charge a credit card or pay from an account all recurring insurance premiums that are incurred from fuel dispensing locations. In another example, the insurance company computer system can send a message to a mobile device of the insured party such as a cell phone displaying the insurance premium and requesting the insured party to accept the charges for the premium. The insurance premium would then be charged to a credit card or paid from a previously established account.

At the same time that the insurance premium is paid, the cost of the fuel can also be paid. In an example, the cost of fuel purchased can be added to the insurance premium to obtain a total amount that is then charged or debited from an account of the insured party. The total cost of fuel and insurance is charged or debited to an account of the insured party through a credit card company or bank 120 (FIG. 1).

The use of insurance premiums determined using future looking predicted vehicle related parameters allows a more accurate risk profile and premium to be determined for the insured party. The appropriate premium can be generated in regards to the risk of an insurance claim or loss.

Figure 10:
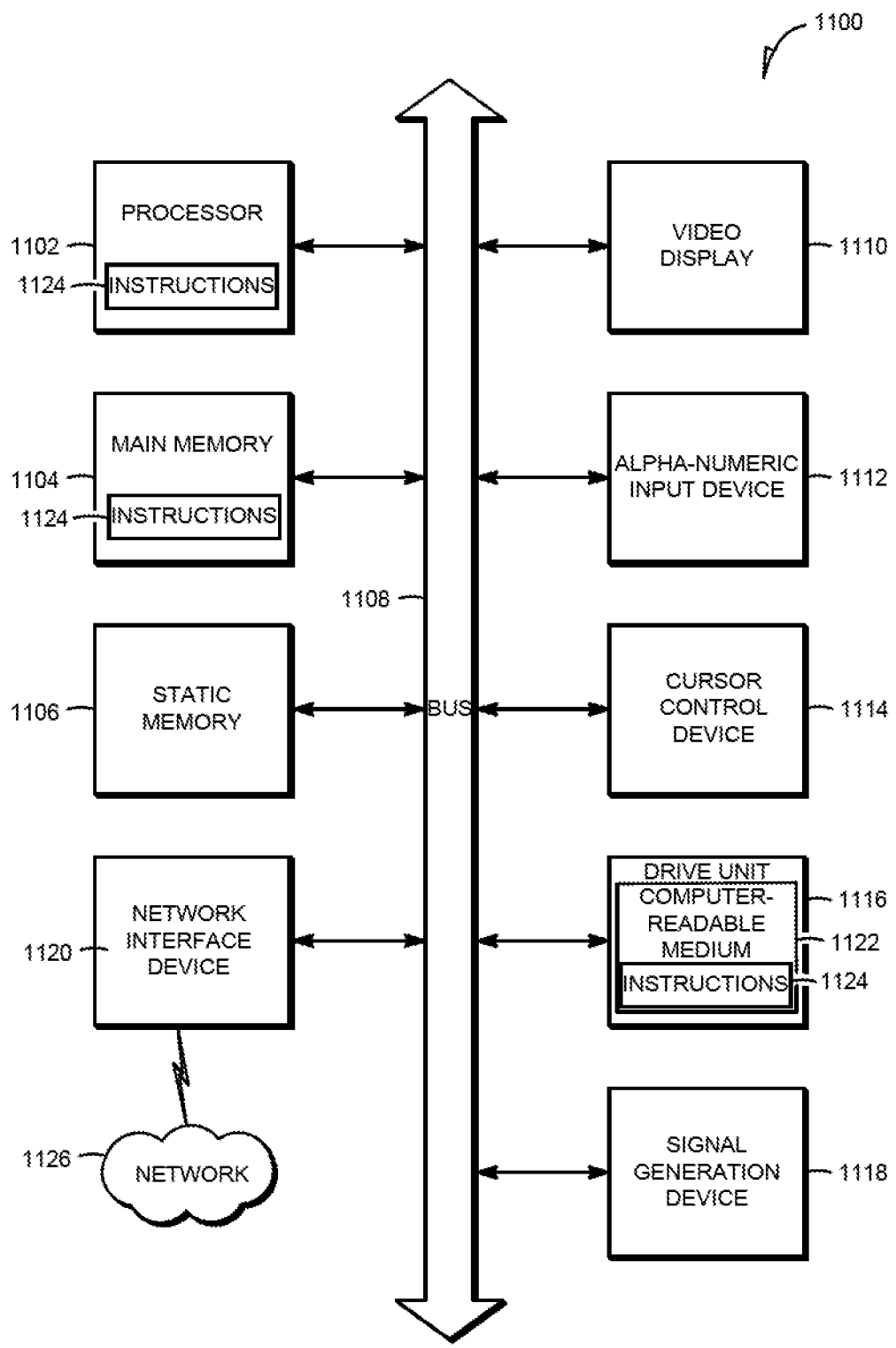
FIG. 10 is a schematic view of a subsystem according to an example embodiment.

FIG. 10 shows a diagrammatic representation of a machine in the example form of a computer system 1100 within which a set of instructions can be executed causing the machine to perform any one or more of the methods, processes, operations, applications, or methodologies discussed herein. The computing systems of the insurance company 107 (FIG. 1), the credit card company, financial institution or bank 120 (FIG. 1) or the fuel dispensing company 130 (FIG. 1) can each include at least one of the computer systems 1100.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a drive unit 1116, a signal generation device 1118 (e.g., a speaker) and a network interface device 1120.

The drive unit 1116 includes a machine-readable medium 1122 on which is stored one or more sets of instructions (e.g., software 1124) embodying any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying out a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules can be implemented as hardware circuitry, optical components, single or multi-processor circuits, memory circuits, software program modules and objects, firmware, and combinations thereof, as appropriate for particular implementations of various embodiments.

An example of a mobile device for use with the methods and systems described herein is a self-powered wireless device capable of a wide-area or local wireless communication with a plurality of other hand-held, mobile, self-powered wireless devices or with base stations that are at a fixed location. The hand-held, mobile, self-powered wireless device can contain a memory, a human input device, a display, and an imaging device. The memory stores a plurality of data relating to application data and other data. "Hand-held" as used in the present disclosure can be devices small enough to be held in a human's hand. "Wireless network" as used in the present disclosure can be a wireless network capable of transmitting data over thousands of feet, for example, a wireless telephone network or wireless computer network or a peer-to-peer network. "Self-powered" as used in the present disclosure describes a device that will have self-contained power available wherever the user wants to take the device away from a base or stationary source of power. In one example, self-powered devices can be powered by a rechargeable battery, e.g., a lithium-ion battery. In an example, a fuel cell can be the mobile, self-power source. In another example, a mobile device is not a fixed-location equipment such as a desktop personal computer.

Aspects of the embodiments are operational with numerous other general purpose or special purpose computing environments or configurations can be used for a computing system. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The communication systems and devices as described herein can be used with various communication standards to connect. Examples include the Internet, but can be any network capable of communicating data between systems. Other communication standards include a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Wireless communications can occur over a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network.

Communications network 1126 may yet further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection.

Many of the above examples relate to automobiles. However, embodiments of the present invention also relate to other vehicles that rely on fuel. Aircraft and boats are also within the scope of the present invention. The risk to an insurance carrier increases with the use of an aircraft or boat, which relates to the use of fuel, and their geographic location. The telemetry data can also apply to insurance costs for aircraft and boats.

The present methods and systems described herein can allow the insurance company to provide usage based vehicle insurance or pay as you drive vehicle insurance. The insurance premium can be added to the cost of a fuel purchase and paid in incremental amounts with every fuel purchase at a fuel or gas station. A small charge for insurance is added to the cost of each tank of fuel purchased. Usage based vehicle insurances has several advantages. The premium amounts are paid more frequently in smaller amounts creating fewer problems for the insured party to make the payment. The insured party would not have the problem of forgetting to purchase insurance because they would purchase insurance with every fuel purchase for their vehicle. The problem of uninsured drivers can be eliminated by requiring all drivers to purchase insurance at the same time that fuel is purchased. Basing the premium at least partially on the actual amount of driving, the actual geographic driving location and the actual driver of the vehicle, a more accurate risk profile and premium can be determined for the insured party. The appropriate premium can be generated in regards to the risk of an insurance claim or loss. The present invention can also determine insurance premiums using the prediction of future vehicle related parameters.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

Thus, methods and systems for population of an application have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A non-transitory machine-readable medium comprising instructions, which when implemented by a computer perform the following operations:
   receive fuel transaction data for a party from a fuel dispenser, the fuel transaction data including a fuel cost for a fueling operation that is being initiated;
   in response to the fueling operation being initiated, receive insurance policy data for an insurance policy, wherein the insurance policy data is specific to the party;

determine a prospective premium for the insurance policy, wherein the prospective premium is at least partially based on the insurance policy data;

add the prospective premium to the fuel cost to generate a total cost; and receive payment of the total cost at a conclusion of the fueling operation.

2. The non-transitory machine-readable medium of claim 1, wherein the fuel transaction data further includes a location of the fuel dispenser.

3. The non-transitory machine-readable medium of claim 1, wherein determining the prospective premium is at least partially based on a vehicle location.

4. The non-transitory machine-readable medium of claim 1, wherein determining the prospective premium is at least partially based on a number of miles driven.

5. The non-transitory machine-readable medium of claim 1, wherein the prospective premium is determined for the insurance policy that is in effect for a time period.

6. The non-transitory machine-readable medium of claim 1, wherein the prospective premium is determined for the insurance policy that is in effect for a number of miles driven.

7. A non-transitory machine-readable medium comprising instructions, which when implemented by a computer perform the following operations:

receive fuel transaction data for a party from a fuel dispenser, the fuel transaction data at least including a fuel cost for a fueling operation that is being initiated;

in response to the fueling operation being initiated, receive insurance policy data for an insurance policy, wherein the insurance policy data is specific to the party;

determine a premium component for the insurance policy, wherein the premium is at least partly based on the insurance policy data;

determine a bill for the insurance policy for an insured party, the bill being equal to the premium component plus the fuel cost; and receive payment of the bill when the fueling operation is concluded.

8. The non-transitory machine-readable medium of claim 7, wherein the premium component is paid from the fuel dispensing location.

9. The non-transitory machine-readable medium of claim 7, wherein the fuel transaction data further includes an odometer reading of the vehicle.

10. The non-transitory machine-readable medium of claim 7, wherein the fuel transaction data further includes at least one driver identity.

11. The non-transitory machine-readable medium of claim 7, wherein the premium component is determined where the insurance policy is in effect for a prospective time period.

12. The non-transitory machine-readable medium of claim 7, wherein the premium component is determined where the insurance policy is in effect for a number of miles driven.

13. A non-transitory machine-readable medium comprising instructions, which when implemented by a computer perform the following operations:

receive fuel transaction data for a party from a fuel dispenser, the fuel transaction data including a fuel cost for a fueling operation that is being initiated;

in response to the fueling operation being initiated, receive insurance policy data for an insurance policy;

determine a premium for the insurance policy, wherein the premium is at least partially based on the insurance policy data;

communicate the premium to the insured party; and receive payment of the premium at the fuel dispenser when the fueling operation is concluded.

14. The non-transitory machine-readable medium of claim 13, wherein the premium is paid from the fuel dispensing location.

15. The non-transitory machine-readable medium of claim 13, wherein the fuel transaction data further includes an odometer reading of the vehicle.

16. The non-transitory machine-readable medium of claim 13, wherein the fuel transaction data further includes at least one driver identity.

17. The non-transitory machine-readable medium of claim 13, wherein an average speed of a vehicle is determined.

18. The non-transitory machine-readable medium of claim 17, wherein the average speed is at last partially used to determine the premium.

19. A non-transitory machine-readable medium comprising instructions, which when implemented by a computer perform the following operations:

receive fuel transaction data for a party, the fuel transaction data including a fuel cost for a fueling operation that is being initiated;

in response to the fueling operation being initiated, receive insurance policy data that is both specific to a party and for an insurance policy;

determine a prospective premium for the insurance policy, wherein the prospective premium is determined at least partially based on the fuel transaction data and the insurance policy data;

add the prospective premium to the fuel cost; and receive payment of the prospective premium and the fuel cost at the conclusion of the fueling operation.

20. The non-transitory machine-readable medium of claim 19, wherein the fuel transaction data further includes a location of the fuel dispenser.

21. The non-transitory machine-readable medium of claim 19, wherein determining the prospective premium is at least partially based on a vehicle location.

22. The non-transitory machine-readable medium of claim 19, wherein determining the prospective premium is at least partially based on a number of miles driven.

23. The non-transitory machine-readable medium of claim 19, wherein the prospective premium is determined for the insurance policy that is in effect for a time period.

24. The non-transitory machine-readable medium of claim 19, wherein the prospective premium is determined for the insurance policy that is in effect for a number of miles driven.

* * * * *

UNITED STATES PATENT AND TRADEMARK OFFICE
CERTIFICATE OF CORRECTION

| | | |
|---|---|---|
| PATENT NO. | : 9,053,469 B1 | Page 1 of 1 |
| APPLICATION NO. | : 12/500742 | |
| DATED | : June 9, 2015 | |
| INVENTOR(S) | : Robert Michael Bohanek, Charles Lee Oakes and Bharat Prasad | |

It is certified that error appears in the above-identified patent and that said Letters Patent is hereby corrected as shown below:

Title Page, item 75

Please update the inventor identification from: "Charles Lee Oakes, III, bOEME, TX" to: "Charles Lee Oakes, III, Boerne, TX".

Signed and Sealed this
Sixth Day of October, 2015

Michelle K. Lee
*Director of the United States Patent and Trademark Office*